UNITED STATES PATENT OFFICE.

EDWARD R. BERRY, OF MALDEN, MASSACHUSETTS, ASSIGNOR TO GENERAL ELECTRIC COMPANY, A CORPORATION OF NEW YORK.

PROCESS OF SHAPING CERAMIC MATERIALS.

1,131,463. Specification of Letters Patent. Patented Mar. 9, 1915.

No Drawing. Application filed June 21, 1913. Serial No. 775,154.

*To all whom it may concern:*

Be it known that I, EDWARD R. BERRY, a citizen of the United States, residing at Malden, in the county of Middlesex, State of Massachusetts, have invented certain new and useful Improvements in the Process of Shaping Ceramic Materials, of which the following is a specification.

Clay and similar earthy materials are commonly shaped into desired form while in a plastic state either by hand or in suitable molds. After a preliminary air drying the shaped articles are properly hardened by firing to a sintering temperature. In some cases the partially dried articles have been trimmed, or drilled, but as they are mechanically weak they can undergo only very simple mechanical operations in this state.

In accordance with the present invention the production of ceramic materials, especially when of regular shape, may be materially improved and greatly cheapened by adding to the clay, or other earthy mass to be molded, a suitable binder, shaping the mixture, preferably into the form of long tubes, rods or the like, and after a preliminary drying treatment, subjecting the shaped articles to a temperature well below the usual sintering temperature to strengthen the articles mechanically. The articles thus treated may be shaped and cut up on machines, being treated much as metal. They are finally hardened by firing in the usual manner.

As illustrative of my invention, I will describe the production of relatively refractory molded articles, such as bushings and other insulators, used for electrical purposes, but it will of course be understood that the process is not limited to making this particular class of material. For example, ordinary china clay and talc may be molded with a binder of sodium silicate. China clay or talc bake at relatively high temperatures, but when the two are mixed with sodium or potassium silicates as a binder, the resulting mixture bakes at a moderate and uniform temperature. The proportions and the amount of binder may be varied considerably but I have found that good results may be obtained by mixing with 25 pounds of talc, 25 pounds of china clay and about 5400 cubic centimeters of a solution of sodium silicate of a specific gravity approximately 1.5. The materials are mixed by methods well understood and therefore not described at this point and are squirted preferably as rods or tubes under pressure by apparatus also well known and therefore not described. Care should be taken not to distort the squirted articles and therefore the squirted mass is preferably delivered upon a belt conveyer.

The squirted articles are left to air dry for a suitable period of time and may then be handled if care is exercised. In some cases two days will be sufficient for the purpose. They are then baked in an oven, such as a steam oven, to a suitable temperature to drive out the free water. I find that in the case of the mixture described a temperature above 100° C., preferably of about 130° C., is satisfactory. The length of time necessary for baking may be varied widely. I find that from five to six hours is sufficient to give the required mechanical strength to the articles. When small parts of regular shape are to be manufactured the rods or tubes are put into ordinary metal working machines, such as lathes or screw machines, where they are formed into the desired shape much as a piece of metal such as brass is treated. After the articles are machined to the desired shape and size they are baked or fired in the manner usually practised with this class of materials to eliminate the combined water. For example, they may be placed in an oven which is started cold in the morning and the temperature gradually increased to about 800° C. at about 3.00 p. m. and then allowed to cool. This particular time and temperature for the firing step is given only for illustrative purposes.

What I claim as new and desire to secure by Letters Patent of the United States, is:

1. The process which consists in shaping a mixture of earthy materials and a binder, heating the shaped article to a temperature above 100° C. to drive out the free water to render it strong and machineable, machining the article and subsequently firing the same to a higher temperature to eliminate the combined water.

2. The process which consists in extruding under pressure a mixture of ceramic material and a binder, air drying the shaped articles, baking at a temperature sufficiently high to drive out the free water to strengthen the same, machining the baked articles and finally firing at a higher temperature.

3. The process which consists in extruding under pressure a mixture of ceramic material and a binder into a body excessive in length with respect to its diameter, air drying the same, baking at a temperature sufficiently high to drive out the free water to render the shaped article machineable, machining and cutting up said body into articles of desired shape, and finally firing to a higher temperature to eliminate the combined water.

4. The process which consists in squirting a mixture of clay, talc and a binder, air drying the squirted objects, baking to a temperature above 100° C., machining the baked articles to desired shape, and finally firing to a temperature of about 800° C.

5. The process which consists in squirting a mixture of clay, talc and sodium silicate in the moist state, air-drying the resulting articles, baking at about 130° C. for several hours to give mechanical strength to said articles, machining the baked articles, and finally firing to a temperature of about 800° C. to eliminate combined water and harden said articles.

6. The process which consists in extruding under pressure a water-containing mixture of china clay, talc and sodium silicate, to form a rod-like article, heating the shaped article at an elevated temperature to drive out water and strengthen the same, machining said body into small parts and subsequently firing at a temperature of about 800° C.

In witness whereof, I have hereunto set my hand this nineteenth day of June, 1913.

EDWARD R. BERRY.

Witnesses:
JOHN A. MCMANUS, Jr.,
CLARENCE W. MANSUR.